United States Patent
Quaedackers

(10) Patent No.: US 10,302,415 B2
(45) Date of Patent: May 28, 2019

(54) METHOD FOR CALCULATING A HEIGHT MAP OF A BODY OF TRANSPARENT MATERIAL HAVING AN INCLINED OR CURVED SURFACE

(71) Applicant: MITUTOYO CORPORATION, Kanagawa (JP)

(72) Inventor: Johannes Anna Quaedackers, Veldhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 329 days.

(21) Appl. No.: 14/737,806

(22) Filed: Jun. 12, 2015

(65) Prior Publication Data
US 2015/0362309 A1 Dec. 17, 2015

(30) Foreign Application Priority Data
Jun. 13, 2014 (EP) .................................. 14172385

(51) Int. Cl.
| | | |
|---|---|---|
| *G01B 5/18* | (2006.01) | |
| *G01B 7/26* | (2006.01) | |
| *G01B 11/22* | (2006.01) | |
| *G01B 13/14* | (2006.01) | |
| *G01B 21/18* | (2006.01) | |
| *G01B 11/06* | (2006.01) | |

(Continued)

(52) U.S. Cl.
CPC ...... *G01B 11/0608* (2013.01); *G01B 11/2441* (2013.01); *G01B 9/02085* (2013.01)

(58) Field of Classification Search
CPC .................... G01B 11/0608; G01B 11/2441

USPC ......................................................... 702/166
See application file for complete search history.

(56) References Cited

U.S. PATENT DOCUMENTS

| | | | |
|---|---|---|---|
| 2006/0012582 A1 | 1/2006 | De Lega | |
| 2006/0017936 A1* | 1/2006 | Cantin | G01B 11/0608 356/604 |
| 2006/0262321 A1 | 11/2006 | De Groot | |

(Continued)

FOREIGN PATENT DOCUMENTS

| | | |
|---|---|---|
| CN | 101019000 | 8/2007 |
| JP | 2011-209098 | 10/2011 |

OTHER PUBLICATIONS

European Search Report for EP14172385; dated Sep. 26, 2014.
(Continued)

*Primary Examiner* — Michael P Nghiem
(74) *Attorney, Agent, or Firm* — Greenblum & Bernstein, P.L.C.

(57) ABSTRACT

Provided is a method for calculating a height map of a sample comprising a body of a transparent material having a refractive index with an inclined or curved surface, the body being provided on an underlying surface extending laterally from underneath the body. The method may include positioning a first area of a body of a transparent material with an inclined or curved surface and a second area of the underlying surface extending laterally from underneath the body under an optical profiler, measuring a height map of the first area and the second area with the optical profiler; and calculating a height map of the inclined or curved surface by using the refractive index, the measured height map of the first area and the second area.

11 Claims, 3 Drawing Sheets

(51) Int. Cl.
*G01B 11/24* (2006.01)
*G01B 9/02* (2006.01)

(56) References Cited

U.S. PATENT DOCUMENTS

| | | | |
|---|---|---|---|
| 2012/0026511 A1 | 2/2012 | Ohkubo et al. | |
| 2013/0128247 A1* | 5/2013 | Khuat Duy | G03F 9/7034 355/63 |
| 2013/0160837 A1* | 6/2013 | Ting | H01G 9/2031 136/256 |
| 2014/0362383 A1* | 12/2014 | Haitjema | G01J 1/02 356/450 |

OTHER PUBLICATIONS

Office Action issued in EP Patent Appl. No. 14172385.8, dated Nov. 14, 2018.
Office Action issued in CN Patent Appl. No. 201510325089.3, dated Jul. 9, 2018, along with an English translation thereof.
Japanese Notification of refusal issued for Japanese Application No. 2015-119210 dated Feb. 14, 2019, along with English language translation thereof.

\* cited by examiner

METHOD FOR CALCULATING A HEIGHT MAP OF A BODY OF TRANSPARENT MATERIAL HAVING AN INCLINED OR CURVED SURFACE

CROSS-REFERENCE TO RELATED APPLICATIONS

The present application claims priority under 35 U.S.C. § 119 of European Application No. 14172385.8, filed on Jun. 13, 2014, the disclosure of which is expressly incorporated by reference herein in its entirety.

BACKGROUND OF THE INVENTION

1. Field of the Invention

The invention relates to a method for calculating a height map of a sample having a body of a transparent material having a refractive index with an inclined surface, the body being provided on an underlying surface extending laterally from underneath the body.

2. Description of Related Art

A height map of a body may be measured with an optical profiler. The optical profiler may, for example, be a broadband interferometer, e.g. a Mirau, Michelson and/or Linnik interferometer apparatus.

Such apparatus for determining a height map of a surface may have:

a broadband illuminator for providing a broadband illumination beam;

a beam splitter for splitting the illumination beam in a reference beam for reflection on a reference reflector and a measurement beam for reflection on the surface;

a detector for receiving an interference radiation intensity from the reflected reference beam from the reference reflector and the reflected measurement beam from the surface;

a scanning means for changing the distance between the surface and the apparatus; and, a processing means for receiving a signal representing the interference radiation intensity received on the detector from the detector and a distance signal from the scanning means and combining both to a height map.

The interference radiation intensity received on the detector has a maximum value when the optical path of the reference beam is equal to the optical path of the measurement beam. The scanning means may change the distance between the test surface and the apparatus with a few hundreds of microns around this maximum value to determine a height map of the surface.

The apparatus may have an objective to image the reflected measurement beam from the surface on the detector. The last lens element LE of the objective (see FIG. 4) of the optical profiler may have a limited numerical aperture and therefore if the surface SF is inclined the reflected measurement beam RM from the inclined surface may be reflected outside the numerical aperture of the objective (see ON) and the apparatus can not measure the height map. In this patent application an inclined surface is defined as a surface with an inclination such that the reflected measurement beam is reflected outside the numerical aperture of the objective of the optical profiler and a normal height map cannot be measured with the optical profiler.

SUMMARY OF THE INVENTION

There is therefore a need for a method for calculating a height map of a body of transparent material with such inclined surface using an optical profiler having an objective with a limited numerical aperture.

A feature of the disclosure provides a method for calculating a height map of a sample having a body of a transparent material having a refractive index (n) with an inclined or curved surface.

Accordingly, in a feature there is provided a method for calculating a height map of a sample having a body of a transparent material having a refractive index (n) with an inclined or curved surface, the body being provided on an underlying surface extending laterally from underneath the body, the method including:

positioning a first area of a body of a transparent material with an inclined or curved surface and a second area of the underlying surface extending laterally from underneath the body under an optical profiler;

measuring a height map of the first area (ZIS) and the second area (ZUS) with the optical profiler; and, calculating a height map of the inclined or curved surface (HIS) by using the refractive index, the measured height map of the first area (ZIS) and the second area (ZUS).

During measuring a height map of the inclined surface (ZIS) with the optical profiler the radiation that is received by the sensor of the optical profiler may be scattered from the underlying surface and not from the inclined surface because the latter is reflected outside the numerical aperture of the objective. The body of transparent material having a refractive index (n) may cause an optical path length in the transparent material that is determined by the refractive index n and the thickness of the body during measuring a height map of the inclined surface (ZIS). This optical path length differs from the physical length causing the underlying surface underneath the body to be measured at a lower height than reality.

Therefore, if one knows the offset (ΔZUS) between the virtual (ZIS) and real height (ZUS) of the underlying surface underneath the body and the refractive index n of the material of the body one can calculate the height map from the inclined or curved surface (HIS) from a measurement by the optical profiler of the height map of the inclined or curved surface (ZIS).

According to a feature the height map of the inclined or curved surface (HIS) is calculated by the formula:

$$HIS = \Delta ZUS/(n-1) + ZUS$$

$$HIS = (ZUS - ZIS)/(n-1) + ZUS$$

With this formula the height map of the inclined or curved surface (HIS) may be calculated even if the reflected radiation from the inclined surface is reflected outside the numerical aperture of the objective. The inclination of the body surface is than too large that ZIS as measured is not the height of the surface of the body. Instead the height algorithm snaps to the signal coming from the underlying surface underneath the body and calculates the height (HIS).

According to a further feature the underlying surface (US) may be a flat surface. By having a flat surface the height of the underlying surface may be used directly to calculate the height of the inclined surface.

According to a further feature the underlying surface (US) may be a metal surface.

According to a further feature the underlying surface (US) may be a semiconductor surface.

According to a further feature the optical profiler may have a limited numerical aperture.

By the limited numerical aperture of the objective the reflected measurement beam from the inclined or curved surface may be reflected outside the numerical aperture.

According to a further feature the formula: HIS=(ZUS−ZIS)/(n−1)+ZUS may be applied to areas where ΔZUS>0. This means that ZIS is lower than the plane corresponding to the underlying layer (ZUS).

According to a further feature the inclined or curved surface may be provided along an edge of the body.

This is advantageously because the underlying surface may be close by and therefore representative of the position of the underlying surface underneath the body. Next, close to the edge the transparent material may be very thin. As such the lateral effect caused by refraction will be very small and may be neglected.

According to a further feature the body further includes a further surface and the method includes:

positioning the further surface underneath the optical profiler; and, measuring a height map of the further surface (ZFS) with the optical profiler.

The further surface may for example be the top of the body in which the inclination or curve is limited so that the measurement apparatus may directly measure a height map. In this way the height of the complete surface (inclined or curved surface plus the further surface) of the body may be measured or calculated with the optical profiler.

According to a further feature the further surface is provided on a top of the body and neighbouring the inclined surface.

According to a further feature the further surface is in accordance with the formula: ZUS−ZIS<0.

If measuring a height map of the inclined surface (ZIS) results in ZUS−ZIS<0. The measurement results of measuring a height map of the inclined surface (ZIS) are valid and can be used directly without any further calculations.

According to a further feature the body is a spherical cap.

The edges of the spherical cap may be the inclined surface which cannot be directly measured with the optical profiler while the top of the spherical cap may be directly measured with the optical profiler.

According to a further feature the optical profiler includes one of a white light interferometer, a phase-shifting interferometry apparatus, a wavelength scanning interferometry apparatus, a confocal apparatus, a shape from focus apparatus, chromatic confocal apparatus, and a structured illumination microscopy apparatus.

Each of these optical profilers may have a limited numerical aperture. By calculating the height map of the inclined surface in accordance of the invention the use of the optical profilers may be extended towards inclined surfaces.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 5b discloses the cross section of a height map as measured of the spherical cap of FIG. 5a.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1A:
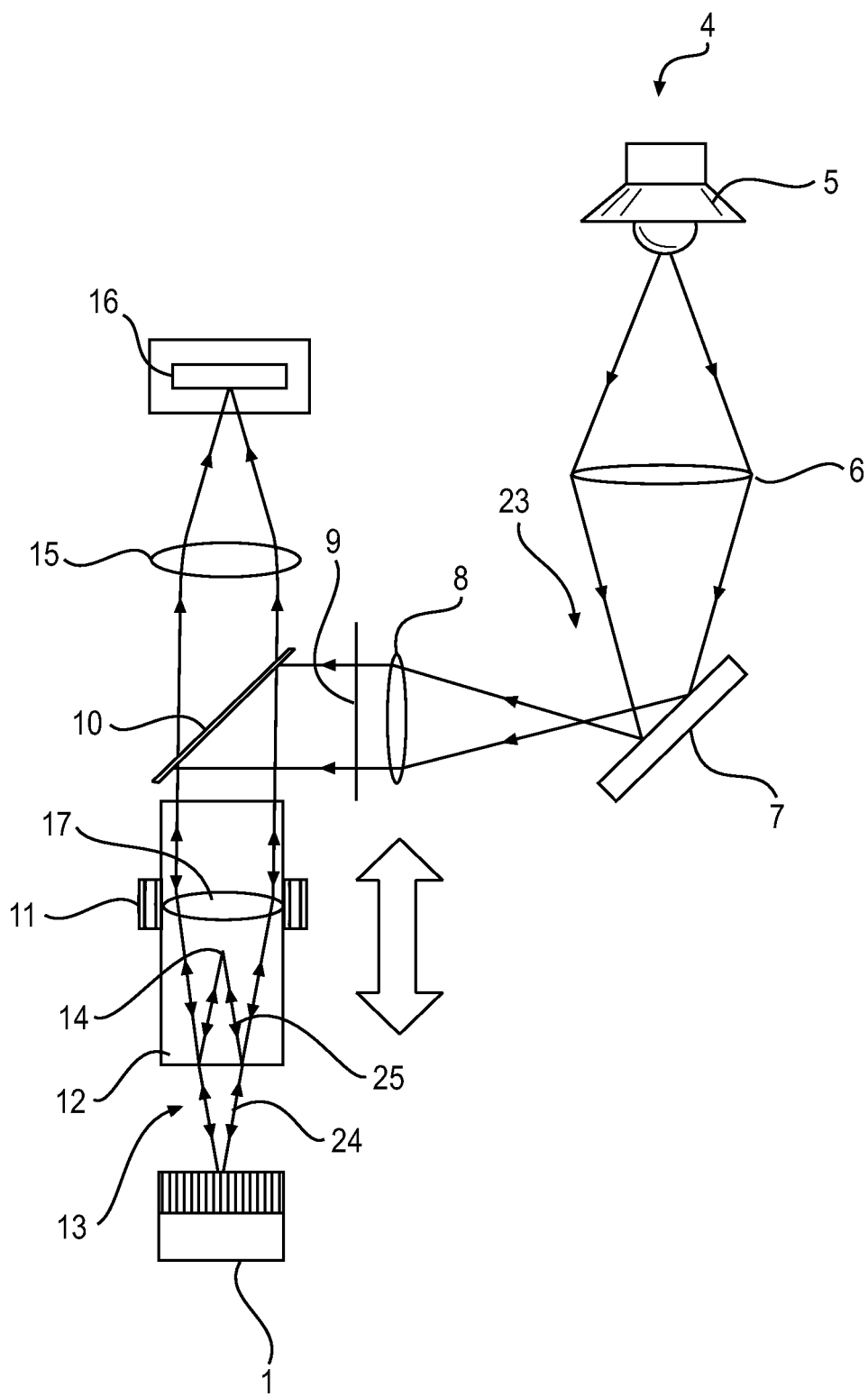
FIGS. 1a and 1b depict a Mirau interferometer system according to a feature of the disclosure.
Figure 1B:
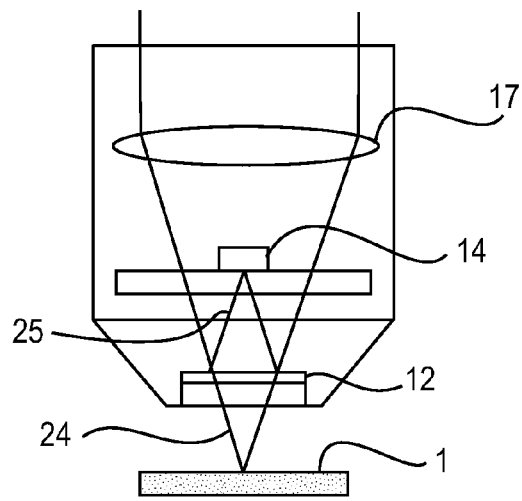

FIGS. 1a and 1b depict optical profilers e.g. interferometer systems to measure a height map of a surface of a sample 1 according to a feature. The optical profilers may be an interferometer apparatus, for example a Mirau 4, a Michelson and/or Linnik interferometer apparatus.

The apparatus 4 of FIGS. 1a and 1b may include an illuminator 23 to provide a narrowband or broadband illumination beam. The illuminator may include a radiation source 5, a first lens 6, a first mirror 7 and a second lens 8, to provide the illumination beam. The illumination beam may be parallel. The illumination beam may be reflected on an illumination beam splitter 10 and traverse through an objective lens 17 before it reaches a beam splitter 12 for splitting the illumination beam in a reference beam 25 and a measurement beam 24.

The reference beam may be reflected on a reference reflector 14. The measurement beam may reflect from a surface of the sample 1. The beam reflected from the reference reflector 14 may reflect again on the beam splitter 12. The beam reflected from the sample 1 may traverse through the beam splitter 12. The reference beam and the measurement beam may interfere and traverse through the objective lens 17, the illumination beam splitter 10 and a lens 15 to the detector 16. The intensity of the interference beam may be measured with the detector 16.

The reference reflector 14, the objective lens 17 and the beam splitter 12 may together form a Mirau objective and may be scanned optically with respect to the sample 1 along the optical axis and through the focal plane of the objective lens 17 with a scanner 11.

A blade 9 may be provided in the illuminator 23 to filter the pupil of the illumination beam.

Figure 2:
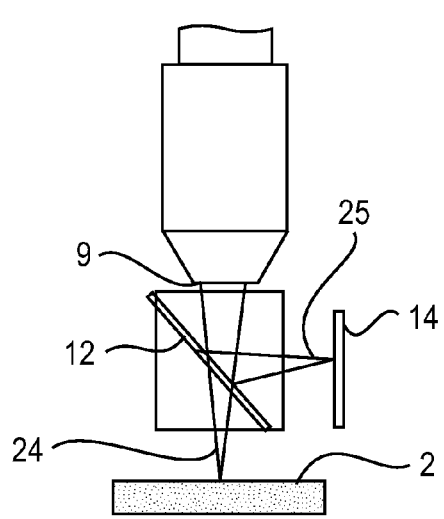
FIG. 2 discloses a Michelson interferometer system according to a feature of the disclosure.
Figure 3:
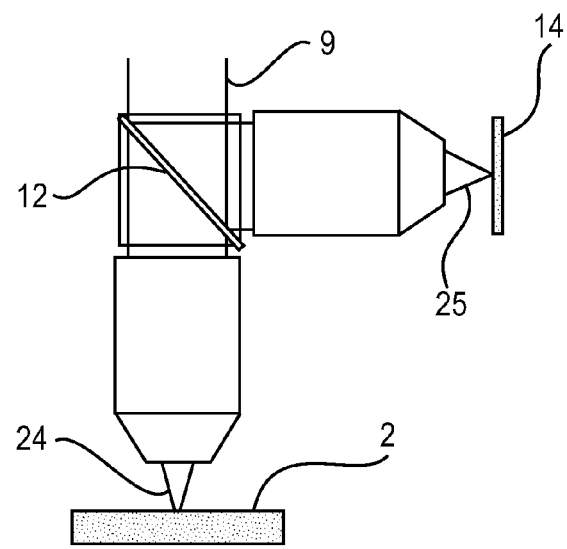
FIG. 3 discloses a Linnik interferometer system according to a feature of the disclosure.

The interferometer apparatus may be, for example a Mirau interferometer (FIGS. 1a and 1b), a Michelson interferometer (FIG. 2) or a Linnik interferometer apparatus (FIG. 3). The interferometer may be used to obtain a correlogram including interference radiation intensity as a function of the scanning distance from the surface of the sample.

Figure 4:
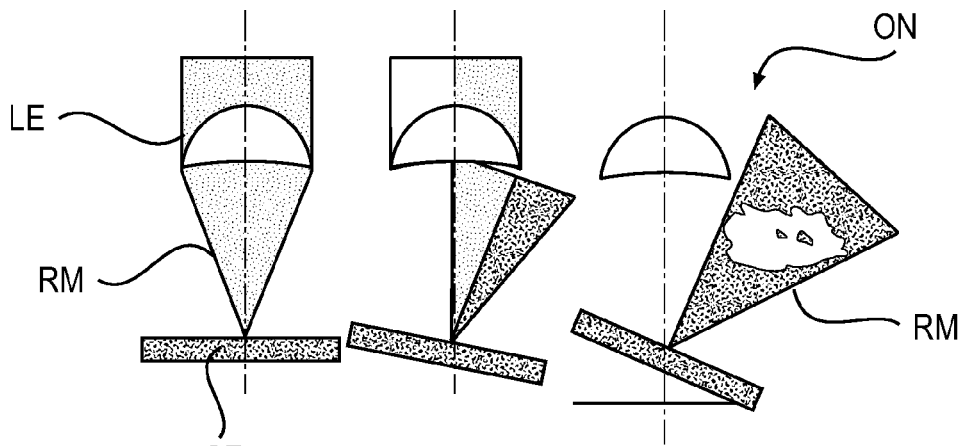
FIG. 4 depicts how the reflected measurement beam from the inclined surface may be reflected outside the numerical aperture of the objective.

FIG. 4 depicts how the reflected measurement beam from the inclined surface may be reflected outside the numerical aperture of the optical profiler. The last lens element LE of an objective (see FIG. 4) of the optical profiler may have a limited numerical aperture or the NA may be restricted to optical elements other than the objective lens. If the surface SF of the sample is inclined the reflected measurement beam RM from the inclined surface may be reflected outside the numerical aperture of the last lens element (see ON) and the apparatus cannot measure the height map.

In this patent application an inclined or curved surface is defined as a surface with an inclination such that the reflected measurement beam is reflected outside or close to the numerical aperture of the objective of the optical profiler so that a normal height map cannot be measured with the optical profiler. If the angle is close to the angular limitation the signal from the upper surface may become weak and our method needs to be applied.

Figure 5A:
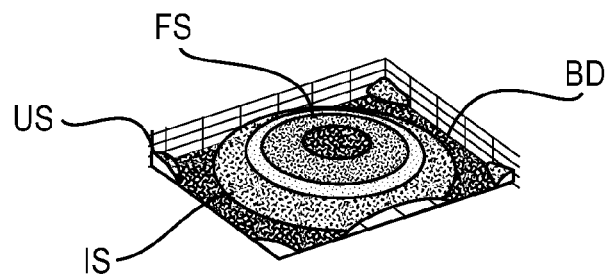
FIG. 5a discloses a spherical cap.

FIG. 5a discloses a transparent spherical cap on a reflective flat substrate. A spherical cap or spherical dome is a portion of a sphere cut off by a plane. The spherical cap includes a body BD of a transparent material having a refractive index (n) with an inclined surface IS. The inclined surface IS may be provided along an edge of the body. The body may be provided on an underlying surface US extending laterally from underneath the body. The underlying surface US may be a flat surface. By having a flat surface the height of the underlying surface US may be used directly to calculate the height of the inclined surface. The underlying surface US may be a metallic or semiconductor surface. A further surface FS may be defined on and around the top of the spherical cap and neighbouring the inclined surface IS.

Figure 5B:
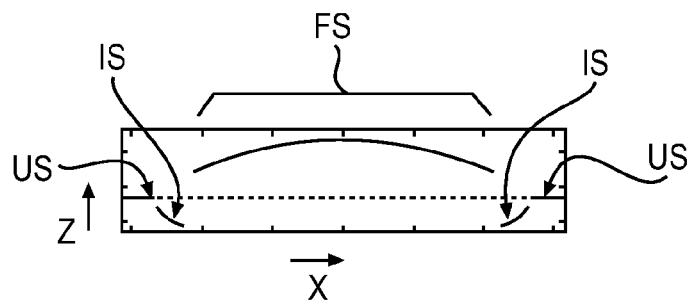

FIG. 5b discloses a cross section through the centre of the spherical cap of the height map of FIG. 5a as measured with an optical profiler. The height map of the further surface FS may be measured with an optical profiler because the inclination is relatively low such that the reflected measurement beam falls largely within the numerical aperture of the last lens element of the objective of the optical profiler.

The height map of the third area of the further surface FS is in accordance with the formula:

$$ZUS-ZIS>0$$

Wherein ZUS is the measured height of the underlying surface US.

The optical profiler has difficulty measuring the height map of inclined surface IS directly. The reflected measurement beam of the inclined surface may fall largely outside the numerical aperture of the optical profiler.

The optical profiler may however receive a measurement beam scattered from the underlying surface US and traversing the body underneath the inclined surface. Since the refractive index of the material of the body is larger than the refractive index of air the optical path length of the measurement beam through the body is enlarged. The position of the underlying surface US is therefore depicted at a lower height than in reality. From this measurement one can reconstruct the real height of the inclined surface if one knows the refractive index and the real and virtual position of the underlying surface because the optical path length OPL through the body is enlarged by (n−1) times the thickness of the body d.

Therefore for calculating a height map of a sample including a body of a transparent material having a refractive index (n) with an inclined or curved surface, the body being provided on an underlying surface extending laterally from underneath the body, one could perform the following method:

positioning a first area of a body of a transparent material with an inclined or curved surface and a second area of the underlying surface extending laterally from underneath the body under an optical profiler;

measuring a height map of the first area (ZIS) and the second area (ZUS) with the optical profiler; and, calculating a height map of the inclined or curved surface (HIS) by using the refractive index, the measured height map of the first area (ZIS) and the second area (ZUS).

By taking a height map measurement of a first area corresponding to a transparent body of interest and a second area corresponding to the underlying surface extending underneath the transparent body the height map of the inclined or curved surface may be calculated while the direct measurement signal from this surface may fall outside the numerical aperture of the measurement apparatus.

One may separate the pixels in the height map that correspond to the second area of the underlying surface extending underneath the transparent body. This might be done by using the differences in pixel contrast or the differences in pixel intensity or by pattern recognition methods to search for object shapes corresponding to the body of interest.

Subsequently one may determine the plane corresponding to the underlying surface using the heights of these pixels. For instance by fitting a plane thought these pixels. The plane corresponding to the underlying surface plane may be subtracted from the original height map of the first area.

After subtracting, the plane corresponding to the underlying surface of these pixels may have negative height values.

In a next step one may determine the offsets between the measured locations of the underlying surface and the calculated plane of the underlying surface. These offsets are the absolute values of the height of pixels with negative heights.

One could calculate the corresponding height of the transparent body surface for pixels that correspond to negative height values of the underlying surface using both the refractive index and the offset of the previous step. Optionally one can add the previously subtracted plane of the underlying surface to restore the original coordinates.

During measuring a height map of the inclined or curved surface (ZIS) with the optical profiler the radiation that is received by the sensor of the optical profiler may be scattered from the underlying surface and not from the inclined surface because the latter is reflected outside the numerical aperture of the objective. The body of transparent material having a refractive index (n) may cause an optical path length in the transparent material that is determined by the refractive index n and the thickness of the body during measuring a height map of the inclined surface (ZIS). This optical path length differs from the physical length causing the underlying surface to be measured at a lower height than reality.

Therefor if one knows the offset between the virtual and real height of the underlying surface (ΔZUS) and the refractive index n of the material of the body one can calculate the height map from the inclined or curved surface (HIS) from a measurement by the optical profiler of the height map of the inclined or curved surface (ZIS).

Since the optical path length OPL through the body is enlarged by (n−1) times the thickness of the body d:

$$\Delta ZUS = ZUS - ZIS = (n-1)d \tag{1}$$

$$d = (ZUS - ZIS)/(n-1) \tag{2}$$

$$HIS = ZUS + d \tag{3}$$

$$HIS = (ZUS - ZIS)/(n-1) + ZUS \tag{4}$$

The height map of the inclined or curved surface HIS can therefore be calculated by the formula: HIS=(ZUS−ZIS)/(n−1)+ZUS.

Figure 5C:
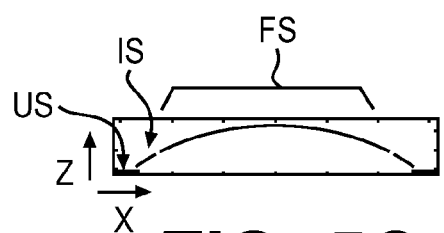
FIG. 5c discloses the cross section of a height map as measured of the spherical cap of FIG. 5a after applying the method described.

FIG. 5c discloses the height map as measured and calculated on a cross section of the spherical cap of FIG. 5a. The height map of the inclined surface IS may be calculated with the above formula. The height map of the underlying surface US and the height map of the further surface FS is measured with the optical profiler.

For the measurements in which ZUS−ZIS>0 there is an indication that the inclination of the surface is too large for the numerical aperture and therefore the formula: HIS=(ZUS−ZIS)/(n−1)+ZUS to calculate the height map HIS of the inclined or curved surface may be used.

For the measurements in which ZUS−ZIS<0 there is an indication that the inclination is within reach of the numerical aperture and therefore the direct measurement of the height map ZIS can be used.

The above formulas may also be used for not flat underlying surfaces. In that case the specific shape of the underlying surface under the body needs to be measured upfront. For example, each Z value for a specific X, Y value needs to be measured for the underlying surface. In a subsequent step the body may be applied on the surface and the above formula may be used to calculate for each position with a different X, Y value the height of the inclined or curved surface HIS.

When using the above explained simple model, we ignore the fact that the inclined surface will refract both the incoming and outgoing rays. For cases where this simple method is not sufficiently accurate a more accurate model might be used. In essence the concept will be the same. For the higher accuracy the simple model can be expanded to include the refraction effects. A simple converging iterative process may be required to solve this problem.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for calculating a height map of a sample comprising a body of a transparent material having a refractive index, the body having one of an inclined surface and a curved surface, the body provided on an underlying surface extending laterally from underneath the body, the method comprising:
   positioning, under an optical profiler having a limited numerical aperture, a first area and a second area, the first area being an area of the body including the inclined or curved surface, and the second area being an area of the underlying surface extending laterally from underneath the body;
   measuring, by the optical profiler, a height map of the first area and a height map of the second area; and
   calculating, by the optical profiler, a height map of the inclined or curved surface by using the refractive index, and the measured height maps of the first area and the second area,
   wherein the one of the inclined surface and the curved surface has an angle to reflect a measurement beam outside the limited numerical aperture,
   wherein the height map of the one of the inclined surface and the curved surface is calculated by formula:

$HIS=(ZUS-ZIS)/(n-1)+ZUS$ wherein:

HIS is the calculated height map of one of the inclined surface and the curved surface,
   ZUS is the measured height map of the second area,
   ZIS is the measured height map of the first area, and n is the refractive index of the transparent material.

2. The method according to claim 1, wherein the underlying surface is a flat surface.

3. The method according to claim 1, wherein the underlying surface is a metal surface.

4. The method according to claim 1, wherein the underlying surface is a semiconductor surface.

5. The method according to claim 1, wherein the formula: HIS=(ZUS−ZIS)/(n−1)+ZUS is applied to areas where ZUS−ZIS>0.

6. The method according to claim 1, wherein the one of the inclined surface and the curved surface of the transparent material is provided along an edge of the body.

7. The method according to claim 1, wherein the body further comprises a further surface and the method further comprises measuring a height map of a third area of the further surface during the measuring of the height map of the first and the second area with the optical profiler.

8. The method according to claim 7, wherein the further surface is provided on a top of the body and is adjacent to the inclined surface.

9. The method according to claim 8, wherein:
   the further surface is in accordance with formula: ZUS−ZIS<0,
   ZUS is the measured height map of the second area, and
   ZIS is the measured height map of the first area.

10. The method according to claim 1, wherein the body is a spherical cap.

11. The method according to claim 1, wherein the optical profiler comprises one of a white light interferometry apparatus, a phase-shifting interferometry apparatus, a wavelength scanning interferometry apparatus, a confocal apparatus, chromatic confocal apparatus, a shape from focus apparatus, a structured illumination microscopy apparatus, and a holography apparatus.

* * * * *